United States Patent Office 3,074,992
Patented Jan. 22, 1963

3,074,992
NOVEL CYCLIC PHOSPHORIC ACID ESTER
AMIDES, AND THE PRODUCTION THEREOF
Herbert Arnold, Bielefeld, Norbert Brock, Uber Bielefeld,
and Friedrich Bourseaux, Bielefeld, Germany, assignors
to Asta-Werke Aktiengesellschaft Chemische Fabrik,
Brackwede/Westf., Germany
No Drawing. Filed July 27, 1959, Ser. No. 829,528
Claims priority, application Germany Dec. 20, 1956
13 Claims. (Cl. 260—461)

The present invention relates to new cyclic thiophosphoric acid ester amides and the production thereof.

This application is a continuation-in-part of application Serial No. 697,536 filed November 2, 1957, now abandoned.

More particularly, the present invention relates to the cyclic thiophosphoric acid ester amides of the following general formula

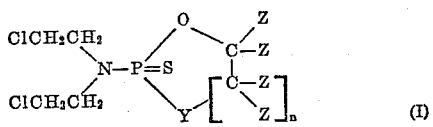

wherein Y represents a member selected from the group consisting of the bivalent radicals —O—, —NH— and —NZ—, each Z being a member selected from the group consisting of the hydrogen atom, the alkyl radicals having a chain of 1–6 carbon atoms and the derivatives of such alkyl radicals being substituted by substituents selected from the group consisting of the hydroxy, lower alkoxy, carboxy, carboxy (lower) alkyl, di-(lower)alkylamino groups, and $n$ is a whole number from 1–4. The substituents Z in the general Formula I are intended to comprise alkyl radicals with straights or branched chains.

The compounds of the general Formula I which are preferred are those in which the substituent Z is a hydrogen atom or an alkyl radical with a straight or branched chain having 1–6 carbon atoms, which if desired can carry one or more hydroxy groups. Among the long chain alkyl radicals having one or more hydroxy groups, the radicals of the sugar series are particularly interesting; $n$ is preferably a whole number from 1–3.

The products of the general Formula I have a particularly favourable therapeutic effect as cytostatics that is to say as agents inhibiting cell growth in the treatment of malignant growths and similar diseases. The products were applied in therapeutic tests using the Yoshida ascitic tumor, the Jensen's sarcoma and the Walker carcinoma. With the Yoshida ascitic tumor the lethal and the curative doses ($DL_{50}$ and $DC_{50}$ values shown in the following table were ascertained. The criterion of the curative doses (DC effect) was a cure in 90 days. The curative doses were applied in four partial doses, whereas the lethal doses were applied in one single dose.

TABLE

| Product | $DC_{50}$ (Yoshida ascitic tumor), mg./kg. | $DL_{50}$, mg./kg. |
|---|---|---|
| Example 2 | 40 | 180 |
| Example 3 | 20 | 200 |
| Example 4 | 15 | 320 |
| Example 7 | 75 | 400 |
| Example 8 | 50 | 400 |
| Example 9 | 40 | 400 |

The compounds according to the present invention are of further interest in the treatment of malignant growths and similar diseases after the removal of tumors caused by said diseases. Cytostatics are not only administered intraveniously to destroy tumor cells carried away by the blood and lympth. The surgeon is also interested in having compounds which may be locally administered to destroy residual tumor cells in the site of operation. Such compounds should be only slightly soluble, should exert a high activity of the functional groups and should be crystalline. For instance, N,N-bis-(β-chloroethyl)-N',O-ethylene thiophosphoric acid diamide seems to be suitable as it is almost insoluble in water and only soluble in lipoids. The activity of its β-chloro-ethyl group is high and the product, furthermore, is crystalline. Pharmacological tests with the resistant DS-carcino-sarcoma showed the above mentioned effectiveness of said compound. The sarcoma was allowed to grow to a size of 20 g. It was then removed by operation (subradically) and 75 mg./kg. of the above mentioned compound was dusted into the wound. While the operated control animals, where the wound was not dusted with the cytostatic, all died on metastasis and relapse of the tumor, a 75% curing effect was obtained with the animals locally treated with the above mentioned cytostatic.

The novel products can be obtained by reacting a compound of the general formula

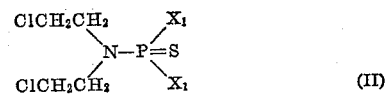

in which $X_1$ is either a halogen atom, preferably a chlorine atom, or the group —OR (R is an ary radical), with a compound of the general formula

wherein Z and $n$ have the same meaning as in Formula I and $a$ is a member selected from the group consisting of the monovalent radicals —OH, —NH₂ and —NH—Z, in an inert solvent, for example dioxane or benzene, in the presence of an acid-binding agent, for example triethylamine, at a temperature of about 15–35° C. or by allowing a compound of the general formula

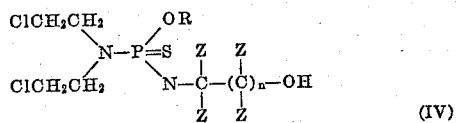

wherein Z, R and $n$ have the significance indicated above, to react with itself in an inert solvent, for example dioxane or benzene, preferably at the boiling point of the solvent in question.

In detail, the process can for example be carried out by reacting the so far unknown N,N-bis-(β-chloroethyl)-thiophosphamide dichloride in the presence of an acid-binding agent, for example triethylamine, with an alkanol-amine or a glycol. The reaction proceeds in accordance with the following equation:
(1) With alkanolamines:

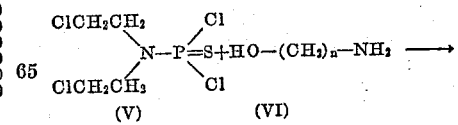

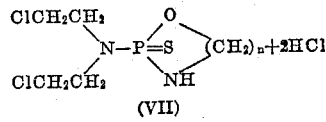

(2) With glycols:

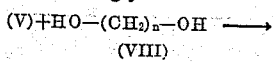

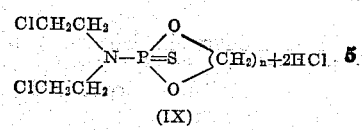

Dioxane or other inert solvents are advantageously used as reaction medium.

Instead of starting from N,N-bis-(β-chloroethyl)-thiophosphamide dichloride, it is possible to start from the compounds of the following general formula

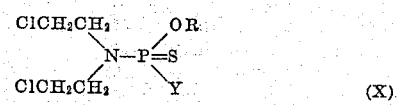

wherein Y is a halogen atom or an —OR group and R is an aryl radical, and to react these starting compounds with an alkanolamine or a glycol. This reaction generally takes place in two stages, the group Y firstly reacting partially with the alkanolamine or the glycol and then ring closure taking place by way of an intramolecular re-esterification.

When an alkanolamine is used, it is for example possible intermediately to form the compound of the general formula

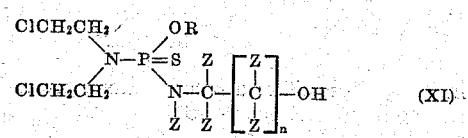

wherein Z, n and R have the meaning already assigned to them, which is then converted into the compound of Formula I.

The tendency to form a ring is so strong that the intermediate products of Formula XI are quite unstable and change into the cyclic products simply on standing and with splitting off of for example phenol. The reaction step last referred to represents by its nature a re-esterification taking place intramolecularly.

Owing to the strong tendency to ring formation, instead of alkanolamines or glycols being used in the aforementioned reactions, it is also possible to introduce functional derivatives of these compounds, such as N-acyl derivatives of alkanolamines or esters of glycols or N,O-diacyl derivatives. Depending on the cohesion of the acyl groups, the reaction of these compounds can take place in one or two stages, these acyl groups initially starting to split off either simultaneously or successively under the reaction condition and the liberated alkanolamine then being cyclised with the N,N-bis-(β-chloroethyl)-thiophosphamide dichloride. These reactions can however also proceed in such a way that the partially acylated alkanolamine derivatives with a free $NH_2$ or OH group initially react monofunctionally with the N,N-bis-(β-chloroethyl)-thiophosphamide dichloride and then the cyclisation takes place in a second stage by elimination of the protecting acyl group prior to or during the consequent reaction, whereby the resulting free group is liberated for cyclisation.

Of particular interest is the formation of the cyclic thiophosphoric acid ester amides with incorporation of amino acids or the amino alcohols corresponding to the latter. This reaction proceeds for example in accordance with the following equation:

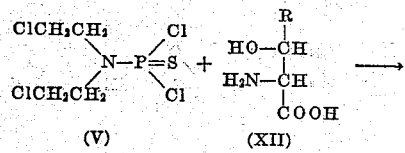

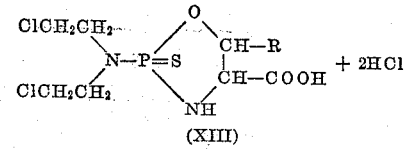

Included among the cyclic thiophosphoric acid ester amides according to present invention are those compounds in which the radicals of carbohydrates, sugars or other polyhydroxy compounds are incorporated into the molecule as a side chain. These products conform to the following general formula:

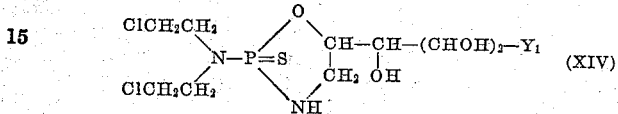

wherein $Y_1$ is either a hydroxymethyl group or an aldehyde group, in the imino group contained in the ring can be replaced by an oxygen atom.

The invention is further explained by the following examples:

*Example 1.—N,N-Bis-(β-Chloroethyl)-Thiophosphoric Acid Amide Dichloride*

125 g. of N,N-bis-(β-chloro-ethylamine)-hydrochloride are heated to boiling with an excess (500 ccm.) of phosphorus sulphochloride for 45 hours until almost completely dissolved. After cooling, the solution is filtered with suction and filtered through carbon. The filtrate is concentrated by evaporation in a water-jet vacuum at 35° C. and the residue is taken up four times with absolute ether, using 400 ccm. on each occasion. The combined ether extracts are filtered through carbon and concentrated by evaporation in vacuo. The residue, which becomes solid in the cold state, is dissolved in and recrystallised from petroleum ether several times. The result is white crystals with a melting point of 34° C.

*Example 2.—N,N-Bis-(β-Chloroethyl)-N',O-Ethylene Thiophosphoric Acid Ester Diamide*

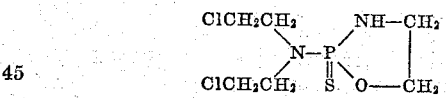

Either a solution of 4.4 g. of aminoethanol and 20 g. of triethylamine in 80 ccm. of absolute dioxane, or a solution of 8.8 g. of aminoethanol in 80 ccm. of absolute dioxane, is added dropwise at 21–25° C. and over a period of 30 minutes to 20 g. of N,N-bis-(β-chloroethyl)-thiophosphoric acid amide dichloride dissolved in 80 ccm. of absolute dioxane, while stirring thoroughly. The mixture is thereafter stirred for another 2 hours, the liquid is filtered off from the precipitated triethylamine hydrochloride, the filter residue is washed with 60 ccm. of absolute dioxane and the solvent is completely evaporated in vacuo at a water bath temperature of 35–50° C. The oily residue is dissolved in a little absolute ethanol and absolute ether is added until cloudiness occurs. After standing for 12 hours in a refrigerator, the liquid is filtered through carbon and again concentrated by evaporation in vacuo at 35–40° C. It is thereafter kept for one hour at 40° C. under high vacuum. The result is an almost colourless, viscous, water-insoluble and undistillable oil, which solidifies after a time. This oil can be dissolved in and recrystallised from a small quantity of methanol, white crystals being obtained which have a melting point of 66–67° C.

*Example 3.—N,N,-Bis-(β-Chloroethyl)-O,O'-Ethylene Thiophosphoric Acid Diester Amide*

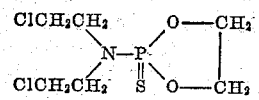

A solution of 4.5 g. of ethylene glycol and 20 g. of triethylamine in 80 ccm. of absolute dioxane is added dropwise at 21–25° C. over a period of 30 minutes to 20 g. of N,N-bis-(β-chloroethyl)-thiophosphoric acid amide dichloride dissolved in 80 ccm. of absolute dioxane while stirring well. After the addition of the solution, the resulting mixture is heated for another three hours in an oil bath to boiling point until the triethylamine hydrochloride has almost quantitatively separated out. The triethylamine hydrochloride separated out is filtered off with suction and washed with absolute dioxane, and the filtrate is concentrated by evaporation in vacuo with a water bath temperature of 35–40° C. The residue is dissolved in a little absolute ethanol and absolute ether is added until clouding occurs. After standing for 12 hours in a refrigerator, the liquid is filtered through carbon and again concentrated by evaporation in vacuo at 35–40° C. The concentrate is then allowed to stand for 1 hour at 50–60° C. under high vacuum. The result is a brownish, water-insoluble and undistillable oil.

*Example 4.—N,N-Bis-(β-Chloroethyl)-N',O-Propylene Thiophosphoric Acid Ester Diamide*

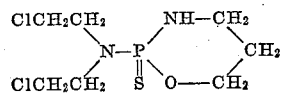

A solution of 6.7 g. of 1.3-amino-propanol and 18.5 g. of triethylamine in 100 ccm. of absolute dioxane is added dropwise over a period of 30 minutes at 22–24° C. to a solution of 24.8 g. of N,N-bis-(β-chloroethyl)-thiophosphoric acid amide dichloride in 100 ccm. of absolute dioxane while stirring thoroughly. After the addition the mixture is stirred for another two hours. The liquid is then filtered off from the precipitated triethylamine hydrochloride and is washed with absolute dioxane. The filtrate is concentrated by evaporation in vacuo at a water bath temperature of 35–40° C. The residue is dissolved in a little absolute ethanol and absolute ether is added until clouding occurs. After standing for 12 hours in a refrigerator, the liquid is filtered through carbon and again concentrated by evaporation in vacuo. The concentrate is thereafter allowed to stand for 1 hour at 60° C. under high vacuum. The result is a slightly yellowish, viscous, water-insoluble and undistillable oil.

*Example 5.—N,N-Bis-(β-Chloroethyl)-N'-Methyl-N', O-Ethylene Thiophosphoric Acid Ester Diamide*

A solution of 4.2 g. of β-hydroxyethyl-N-methyl amine and 12 g. of triethylamine in 50 ccm. of absolute dioxane is added dropwise at a temperature of 25–30° C. to a solution of 15.4 g. of N,N-bis-(β-chloroethyl)-thiophosphoric acid amide dichloride in 50 ccm. of absolute dioxane while stirring well. After this solution has been added, stirring is continued for another 2 hours and then the liquid is filtered off from the precipitated triethylamine hydrochloride. The filtrate is concentrated by evaporation in a water-jet vacuum, the residue is dissolved in a little absolute ethanol and absolute ether is added until clouding occurs. After standing for 24 hours in a refrigerator, the resulting liquid is filtered through carbon and again concentrated by evaporation in a water-jet vacuum. The concentrate is thereafter allowed to stand for one hour in oil pump vacuum at 60° C. and the result is a slightly yellow undistillable oil.

*Example 6.—N,N-Bis-(β-Chloroethyl)-O,O'-(D-Sorbitol)-Thiophosphoric Acid Diester Amide*

A solution of 15 g. of N,N-bis-(β-chloroethyl)-thiophosphoric acid amide dichloride in 50 ccm. of absolute dioxane is added dropwise and while stirring well to a solution of 10.1 g. of d-sorbitol and 11 g. of triethylamine in 80 ccm. of dimethyl formamide, this latter solution being heated to 42° C. After the addition, the mixture is heated for 2 hours to boiling point and then, after cooling, is filtered with suction from the precipitated triethylamine hydrochloride. The filtrate is concentrated by evaporation in a water-jet vacuum and the residue is dissolved in absolute ethanol. After the addition of a large quantity of acetone, the resulting liquid is filtered through carbon and again concentrated by evaporation in a water-jet vacuum. The concentrate is thereafter allowed to stand for 2 hours in oil pump vacuum at 70° C., the result being a viscous, brown and water-soluble syrup.

*Example 7.—N,N - Bis - (β - Chloroethyl) - N',O - [(3-Methyl) - Propylene] - Thiophosphoric Acid Ester Diamide*

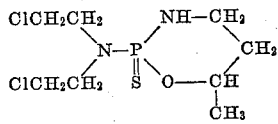

A solution of 4.3 g. aminobutanol-2.4 and 10 g. triethylamine in 80 ccm. dioxane abs. is added dropwise at a temperature of 25–30° C. while stirring well to a solution of 13.5 g. of N,N-bis-(β-chloroethyl)-thiophosphoric acid amide dichloride. After the addition of the solution the resulting mixture is stirred for 2 hours. Then the triethylamine hydrochloride separated out is filtered off. The reaction mixture is worked up as described in Example 5. The result is a slightly coloured oil that is undistillable.

*Example 8.—N,N-Bis-(β-Chloroethyl)-O,O'-Butylene Thiophosphoric Acid Diester Amide*

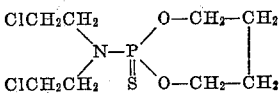

A solution of 15 g. N,N-bis-(β-chloroethyl)-thiophosphoric acid amide dichloride, 4.9 g. butyleneglycol-1.4 and 11 g. of triethylamine in 100 ccm. benzene abs. is heated for several hours at a temperature of 35° C. until the triethylamine hydrochloride has separated quantitatively. The mixture is worked up as shown in Example 3. The result is a yellow, undistillable oil.

*Example 9.—N,N - Bis - (β - Chloroethyl) - N',O - [(2-Methyl) - Ethylene] - Thiophosphoric Acid Ester Diamide*

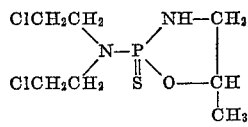

A solution of 4 g. isopropanolamine and 11 g. triethylamine in 80 ccm. dioxane abs. is added dropwise at a temperature of 25–29° C. to a solution of 15 g. N,N-bis-(β-chloroethyl)-thiophosphoric acid amide dichloride. The quantitatively separated triethylamine hydrochloride is filtered off. The mixture is worked up as shown in Example 5. The result is a slightly coloured, undistillable oil.

*Example 10.—N,N,-Bis-(β-Chloroethyl)-O,O'-Propylene Thiophosphoric Acid Diester Amide*

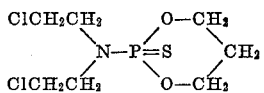

A solution of 15 g. of N,N-bis-(β-chloroethyl) thiophosphoric acid amide dichloride, 4 g. 1.3-propylene glycol, and 11 g. of triethylamine in 150 ccm. of absolute diaxone is refluxed until triethylamine hydrochloride is precipitated almost quantitatively. After the separation of triethylamine hydrochloride, the resulting solution is filtered over charcoal and the filtrate is evaporated in a vacuum at 35–40° C. The oily residue is dissolved in a small amount of absolute alcohol. Absolute ether is added to the resulting solution until it turns turbid. Thereby, some further contaminations are precipitated. After standing over night in an ice box, the solution is again evaporated in a vacuum. In order to remove volatile products, the residue is evaporated in a high vacuum for several hours. A yellowish, rather thin oil is obtained.

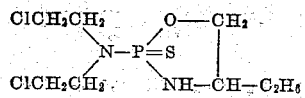

*Example 11.—N,N' - Bis - (β - Chloroethyl) N',O - [(1-Ethyl)-Ethylene]-Thiophosphoric Acid Ester Diamide*

A solution of 4.8 g. of 2-amino butanol-1 and 11 g. of triethylamine in 80 ccm. of absolute dioxane is added dropwise with good stirring to a solution of 15 g. of N,N-bis(β-chloroethyl)-thiophosphoric acid amide dichloride in 80 ccm. of absolute dioxane. After some hours triethylamine hydrochloride is precipitated almost quantitatively. It is separated and the resulting solution is filtered over charcoal. The filtrate is evaporated in a vacuum at 35–40° C. The reaction product is further purified as described in the preceding Example 10. Thereby, a viscous oil is obtained which solidifies after some time.

*Example 12.—N,N - (β - Chloroethyl) - N',O - Ethylen-N'-β-Hydroxyethyl-Thiophosphoric Acid Ester Diamide*

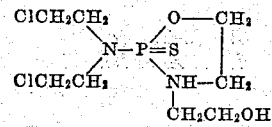

A solution of 5.7 g. of diethanolamine and 11 g. of triethylamine in 100 ccm. of absolute dioxane is added dropwise with good stirring to a solution of 15 g. of N,N-bis-(β-chloroethyl)-thiophosphoric acid amide dichloride in 80 ccm. of absolute dioxane. After almost quantitative precipitation of triethylamine hydrochloride and separation of the precipitate from the reaction mixture, the resulting solution is filtered over charcoal and evaporated in a vacuum at slightly elevated temperature. The further purification of the reaction product is carried out as described in Example 10. Thereby, a yellow oil is obtained.

What we claim is:

1. Novel products of the following general formula

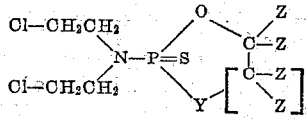

wherein Y represents a member of the group consisting of the bivalent radicals —O—, —NH— and —NZ—, each Z being a member selected from the group consisting of the hydrogen atom, the lower alkyl radicals and the hydroxyl substituted lower alkyl radicals, and n is a whole number from 1 to 3.

2. N,N - bis - (β - chloroethyl) - O,O' - ethylene thiophosphoric acid amide.

3. N,N - bis - (β - chloroethyl) - N',O - propylene thiophosphoric acid diamide.

4. N,N - bis - (β - chloroethyl) - N',O - [(2 - methyl)-ethylene]-thiophosphoric acid amide.

5. N,N - bis - (β - chloroethyl) - N',O - ethylene thiophosphoric acid diamide.

6. N,N - bis - (β - chloroethyl) - thiophosphoric acid amide dichloride.

7. N,N - bis - (β - chloroethyl) - N' - methyl - N',O-ethylene thiophosphoric acid ester diamide.

8. N,N - bis - (β - chloroethyl) - O,O' - (d - sorbitol)-thiophosphoric acid diester amide.

9. N,N - bis - (β - chloroethyl) - N',O - [(3 - methyl)-propylene]-thiophosphoric acid ester diamide.

10. N,N - bis - (β - chloroethyl) - O,O' - butylene thiophosphoric acid diester amide.

11. N,N - bis - (β - chloroethyl) - O,O' - propylene thiophosphoric acid diester amide.

12. N,N - bis - (β - chloroethyl) - N,O - [(ethyl)-ethylene]-thiophosphoric acid ester diamide.

13. N,N - bis - (β - chloroethyl) - N',O - ethylene - N'-β-hydroxyethyl thiophosphoric acid ester diamide.

References Cited in the file of this patent

UNITED STATES PATENTS

| | | |
|---|---|---|
| 2,865,948 | Fusco | Dec. 23, 1958 |
| 2,994,638 | Malz et al. | Aug. 1, 1959 |

OTHER REFERENCES

Arnold et al.: Naturwissenschaften, vol. 45, pp. 64–66 (1958 February.)